Figure 1:
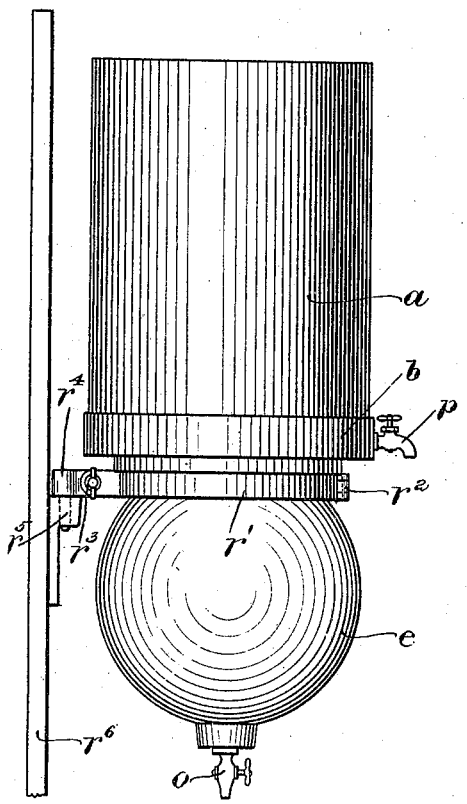

A. F. RANDALL.
COMBINED WATER FILTER AND COOLER.
APPLICATION FILED OCT. 19, 1905.

963,324.

Patented July 5, 1910.

Witnesses:
Chas. F. Randall
Edith J. Anderson.

Inventor:
Aaron F. Randall

UNITED STATES PATENT OFFICE.

AARON F. RANDALL, OF BOSTON, MASSACHUSETTS, ASSIGNOR OF ONE-HALF TO RHODA E. FERRY, OF DORCHESTER, MASSACHUSETTS.

COMBINED WATER FILTER AND COOLER.

963,324.   Specification of Letters Patent.   Patented July 5, 1910.

Application filed October 19, 1905. Serial No. 283,548.

*To all whom it may concern:*

Be it known that I, AARON F. RANDALL, a citizen of the United States, residing at Boston, in the county of Suffolk, State of Massachusetts, have invented a certain new and useful Improvement in Combined Water Filters and Coolers, of which the following is a specification, reference being had therein to the accompanying drawings.

The general object of the invention is to provide a convenient and practical means of preparing water for drinking purposes, by which the water shall be filtered and thereby purified, and, in addition, shall be cooled, so as to render the same palatable, without the use of ice or chemicals.

Broadly stated, the invention consists in an apparatus having combined therein a gravity water-filter, and an evaporating jar or equivalent receptacle having a porous shell through which a small portion of the water may percolate to the exterior surface to be evaporated there, with resulting cooling of the contents of the jar or receptacle.

The invention is more especially adapted for use in hot climates and in other situations where no ice is to be obtained, or where ice is expensive and difficult to procure. By its use water from lakes, rivers, and other convenient sources may be rendered pure, potable, and palatable.

The invention consists, also, in certain novel features of the filtering device, and in the construction of the apparatus, as will be explained and more particularly defined in the claims.

An embodiment of the invention is shown in the drawings, in which latter,—

Figure 2:
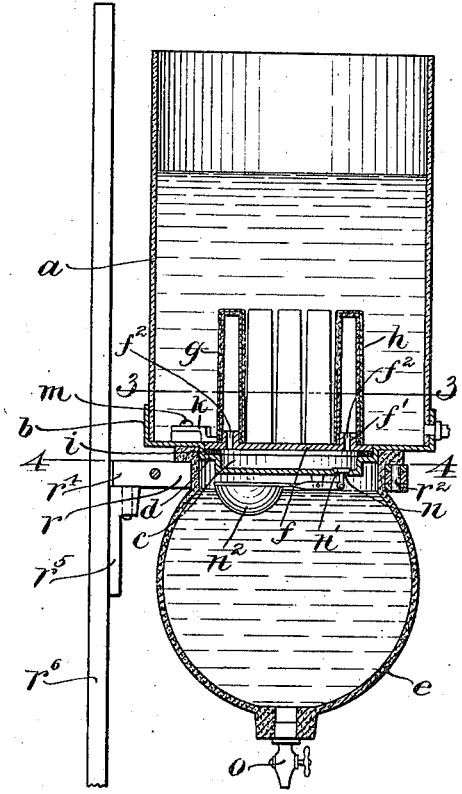
Figures 3, 4, 5:
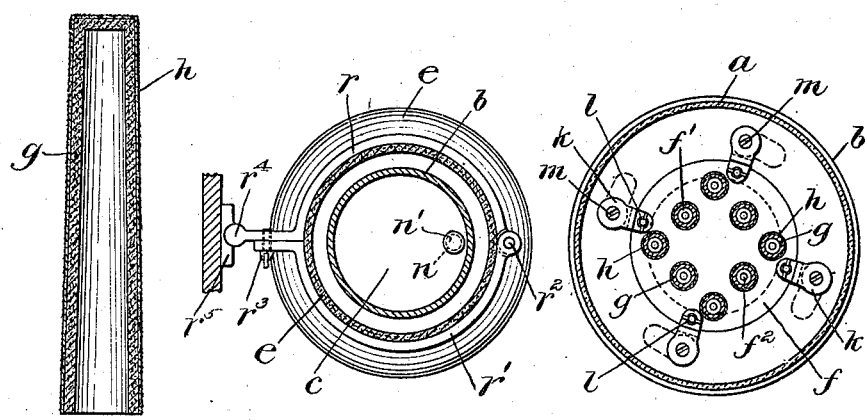

Figure 1 shows in elevation an apparatus containing the invention. Fig. 2 is a central vertical transverse section thereof. Fig. 3 is a view in horizontal section on line 3, 3, Fig. 2. Fig. 4 is a view in horizontal section on line 4, 4, Fig. 2. Fig. 5 is a view in central vertical transverse section of one of the filtering tubes of Fig. 2, and its covering, sheath, or cot.

Having reference to the drawings,—at $a$ is the shell of a receptacle or reservoir for unfiltered water, and $b$ is the base of the said receptacle or reservoir. In practice, the said receptacle or reservoir will be provided with a suitable removable cover, which, however, is not necessary to be shown. The central portion of the said base is depressed, to form a chamber $c$, the wall of the said chamber being formed with an annular shelf $d$ constituting a seat for the filter. At $e$ is a jar or receptacle of porous material, such, for instance, as unglazed porcelain. The depressed portion of the base $b$ of the reservoir or receptacle for unfiltered water enters the open top or mouth of the jar $a$ and fits the same, as shown in Fig. 2.

The filter is placed within the reservoir or receptacle for unfiltered water, at the bottom thereof, and comprises a base-plate $f$, a series of filtering tubes $g$ carried by the said base-plate, and sheaths or cots $h$ which are drawn upon the said filtering tubes. The rim of the base-plate fits within the upper portion of the chamber $c$, upon the shelf $d$, and thereby is held in place and supported. A packing-ring $i$ is applied to the shelf $d$, under the marginal portion or rim of the base-plate, to prevent unfiltered water from passing between the said marginal portion or rim and the shelf into the chamber $c$. The filter is removably secured in place by means of swinging clips $k$, $k$, which are provided with thumb-screws $l$, $l$. The said clips are pivoted at $m$, $m$, upon the base $b$ of the reservoir or receptacle for unfiltered water. When they occupy their retracted positions shown by dotted lines in Fig. 3 the filter may be inserted or removed. When the filter is in place and the clips are turned into the positions in which they are shown in full lines in Fig. 2, above the marginal portion or rim of the base-plate $f$ of the filter, they serve to hold the filter in position. By tightening down the binding-screws $l$, $l$, against the base-plate of the filter, the said base-plate will be pressed firmly against the packing $i$. The filtering tubes $g$, $g$, are made of unglazed porcelain or other suitable porous material. They are each closed at one end thereof and open at the other. For the support thereof, the base-plate $f$ is formed with bosses or nipples $f'$, $f'$, rising from its upper surface. The lower ends of the filtering tubes are placed upon and fitted over the said bosses or nipples. A thin packing sleeve or ring may be applied in practice to each boss or nipple to prevent leakage of unfiltered water through between the lower end of a tube and the boss or nipple. Holes $f^2$ formed through the bosses or nipples permit the filtered water to pass from the interiors of the filtering tubes into the chamber $c$.

The sheath or cot $h$ which is employed in connection with each filtering tube is made of felt, or of closely woven fibrous material having a nap or pile, preferably on both surfaces thereof. The said sheath or cot fits closely to the exterior of the filtering tube to which it is applied. I term the same a "mud arrester." It serves to catch and retain the suspended matters and albuminoids which are carried by the unfiltered water. These lodge within the fibers of the sheath or cot, and thereby are prevented from entering the porosities of the material of which the filtering tube is composed. By arresting the suspended matters before the water comes into contact with the filtering tube, they are prevented from entering and clogging up the said porosities. Such matters, etc., in consequence of being of a slimy nature, if permitted to enter the porosities of the tube, will speedily clog the same and greatly impair the filtering capacity of the tube. The "mud arrester" effectually strains the water and removes suspended matter therefrom before it reaches the tube, so that necessity for frequent removal of the latter for the purpose of being cleaned is obviated, it being necessary only to remove the "mud arrester" when its condition requires removal, and replace it by a new one. The efficiency of the filtering tube thereby is maintained indefinitely.

The chamber $c$ receives the filtered water from the filtering tubes. An opening $n$ in the depressed central portion of the base $b$ forms a passage through which the filtered water may flow from the said chamber $c$ into the jar $e$. In connection with the opening $n$ a valve $n'$ is employed, for the purpose of controlling the said flow. The said valve is connected to the lever of a float $n^2$ within the jar $e$, the said lever being pivoted to a lug extending down from the under side of the depressed portion of the base $b$. As soon as the interior space of the jar $e$ is filled far enough to enable the water within the same to raise the float, the valve $n'$ is operated to close the opening $n$, so as to arrest further flow from chamber $c$ into the jar, and thereby obviate overflow at the top of the jar, this maintaining a uniform predetermined height of water within the jar. This float-valve operates automatically to cause the loss resulting from evaporation at the exterior of the receptacle $e$ to be replaced.

The jar $e$ is provided with a faucet $o$, enabling the contents thereof to be drawn off as required. Base $b$ of the receptacle or reservoir for unfiltered water is provided with a faucet $p$ enabling the said receptacle or reservoir to be emptied when necessary.

The apparatus is shown supported by means of a collar which fits around the neck of the jar $e$, the said collar being made in two parts $r$, $r'$, which are hinged together at $r^2$ and provided with a securing screw $r^3$ by means of which they may be secured together in closed condition. The portion $r$ is furnished with a foot $r^4$ fitting removably within a socket in a bracket $r^5$, which latter is attached to a support represented at $r^6$. The receptacle or reservoir for unfiltered water is supported by the jar $e$. The two-part construction of the cooler and the use of the securing screw enables the collar to be secured in place upon the neck of the jar, or removed therefrom, whenever required. The removable connection of the collar with the bracket $r^5$ enables the apparatus to be applied to its support and removed therefrom when desired.

While I have been particular to describe the details of construction of the illustrated embodiment of the invention, it should be understood that the construction may be varied or simplified in different respects without necessarily involving a departure from the spirit and principles of the invention. In some instances the use of a float-valve for the purpose of regulating the flow of filtered water into the jar $e$ may be dispensed with. "Mud arresters" on the order of the sheaths or cots $h$ may be used on filtering media of different kinds and forms of construction. They are inexpensive and easily applied or removed.

I claim as my invention:—

1. In combination, an unfiltered water receptacle or reservoir having a base provided with a depression with a ledge therein, a filter applied within the said depression and resting on said ledge, a series of swinging clips applied to the said base, thumb-screws applied to said clips and adapted to press upon the said filter to hold it in place, the said clips being adapted to be swung aside to enable the filter to be removed, said base being provided in the part below the said removable plate with an aperture for the passage of water to escape therefrom, and a receptacle for the filtered water.

2. In a gravity water-filter, in combination, an unfiltered water receptacle having in the bottom thereof a downward projecting depression extending around the same and having a flange or shelf, a plate fitting the said depression having one or more bosses integral with the body thereof and provided with openings extending vertically therethrough, and filtering tubes applied to said bosses.

3. In a water filter, an unglazed porcelain or earthen filtering tube having combined therewith a removable sheath or cot of fibrous material serving to catch and prevent suspended matters from entering the porosities of the tube.

In testimony whereof I affix my signature in presence of two witnesses.

AARON F. RANDALL.

Witnesses:
  CHAS. F. RANDALL,
  EDITH J. ANDERSON.